(12) United States Patent
Jung

(10) Patent No.: US 6,493,614 B1
(45) Date of Patent: Dec. 10, 2002

(54) AUTOMATIC GUIDED SYSTEM AND CONTROL METHOD THEREOF

(75) Inventor: Sung-II Jung, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/155,131

(22) Filed: May 28, 2002

(30) Foreign Application Priority Data

Dec. 24, 2001 (KR) ........................................ 01-0084392

(51) Int. Cl.[7] ................................................. G05D 1/00
(52) U.S. Cl. ............................ 701/23; 701/69; 701/210; 180/168; 318/568.12
(58) Field of Search ............................ 701/23, 69, 210, 701/26; 180/167, 168; 318/568.12

(56) References Cited

U.S. PATENT DOCUMENTS

| | | | |
|---|---|---|---|
| 5,170,351 A | * 12/1992 | Nemoto et al. | 701/23 |
| 5,525,884 A | * 6/1996 | Sugiura et al. | 318/587 |
| 5,961,559 A | * 10/1999 | Shimbara et al. | 701/23 |
| 6,256,560 B1 | 7/2001 | Kim et al. | |

* cited by examiner

*Primary Examiner*—Richard M. Camby
(74) *Attorney, Agent, or Firm*—Staas & Halsey LLP

(57) ABSTRACT

An automatic guided system and control method thereof includes guide lines, stop position tags formed beside the guide lines, and an automatic guided vehicle moving along the guide lines and stopping at stop positions of the stop position tags. The automatic guided system also includes a vision unit to photograph the guide lines, a stop position detection unit to detect the stop position tags, a moving unit to drive wheels of the automatic guided vehicle, an encoding unit to detect rotation of the wheels, and a control unit to control the moving unit. The control method includes calculating first position information using a predetermined color code corresponding to a color of a second guide line and information of one of the stop position tags. The control method also includes calculating second position information using an encoder value for wheels of the automatic guided vehicle, calculating an error of position recognition using the first and second position information, and correcting the second position information.

17 Claims, 5 Drawing Sheets

US 6,493,614 B1

AUTOMATIC GUIDED SYSTEM AND CONTROL METHOD THEREOF

CROSS-REFERENCE TO RELATED APPLICATIONS

This application claims the benefit of Korean Application No. 2001-84392, filed Dec. 24, 2001, in the Korean Industrial Property Office, the disclosure of which is incorporated hereby by reference.

BACKGROUND OF THE INVENTION

1. Field of the Invention

The present invention relates generally to an automatic guided system, and more particularly to an automatic guided system and control method thereof, which is capable of correcting an error of position recognition.

2. Description of the Prior Art

In general, a conventional Automatic Guided Vehicle (AGV) is configured to move a load along a guide line positioned on a road surface. The conventional AGV moves along a continuous guide line by detecting the continuous guide line, which is formed of a magnetic tape and positioned on a path of movement. The conventional AGV uses a magnetic sensor to detect the continuous guide line. Additionally, the conventional AGV recognizes a stop position by detecting a stop position tag located at a certain position of the guide line, and performs work by operating a robot at the stop position.

A position of the conventional AGV is recognized by detecting the stop position tag and an encoder value for rotation of wheels of the AGV. However, when the stop position tag is not recognized or the encoder value is erroneous, an accident may occur due to the erroneous recognition of the position of the AGV.

SUMMARY OF THE INVENTION

Accordingly, it is an object of the present invention to provide an automatic guided system and control method thereof, which corrects an error of position recognition while an automatic guided vehicle of the automatic guided system moves.

Additional objects and advantages of the invention will be set forth in part in the description which follows and, in part, will be obvious from the description, or may be learned by practice of the invention.

The foregoing and other objects of the present invention are achieved by providing an automatic guided system including guide lines positioned along a path of movement, stop position tags formed beside the guide lines at predetermined positions, and an automatic guided vehicle moving along the guide lines and stopping at the positions of the stop position tags to perform work using a robot. The automatic guided vehicle includes a vision unit to photograph the guide lines, a stop position detection unit to detect the stop position tags, a moving unit to drive wheels of the automatic guided vehicle to move the vehicle, an encoding unit to detect rotation of the wheels, and a control unit to control the moving unit in response to output data from the vision unit, the stop position detection unit, and the encoding unit.

The foregoing and other objects of the present invention are achieved by providing a method to control an automatic guided system having an automatic guided vehicle moving along first and second guide lines and stopping at predetermined positions of stop position tags. The first guide line is divided into a plurality of zones at first regular intervals and the second guide line is divided into a plurality of zones the same as the first guide line. Each of the zones of the second guide line are divided into a plurality of differently colored sections at second regular intervals. Thus, according to an aspect of the present invention, the method to control an automatic guided system includes calculating first position information using a predetermined color code corresponding to the respective colored section of the second guide line and information of one of the stop position tags. The method also includes calculating second position information using an encoder value for wheels of the automatic guided vehicle, calculating an error of position recognition using the first and second position information, and correcting the second position information.

BRIEF DESCRIPTION OF THE DRAWINGS

These and other objects and advantages of the invention will become apparent and more appreciated from the following description of the preferred embodiments, taken in conjunction with the accompanying drawings of which.

DESCRIPTION OF THE PREFERRED EMBODIMENTS

Figure 1:
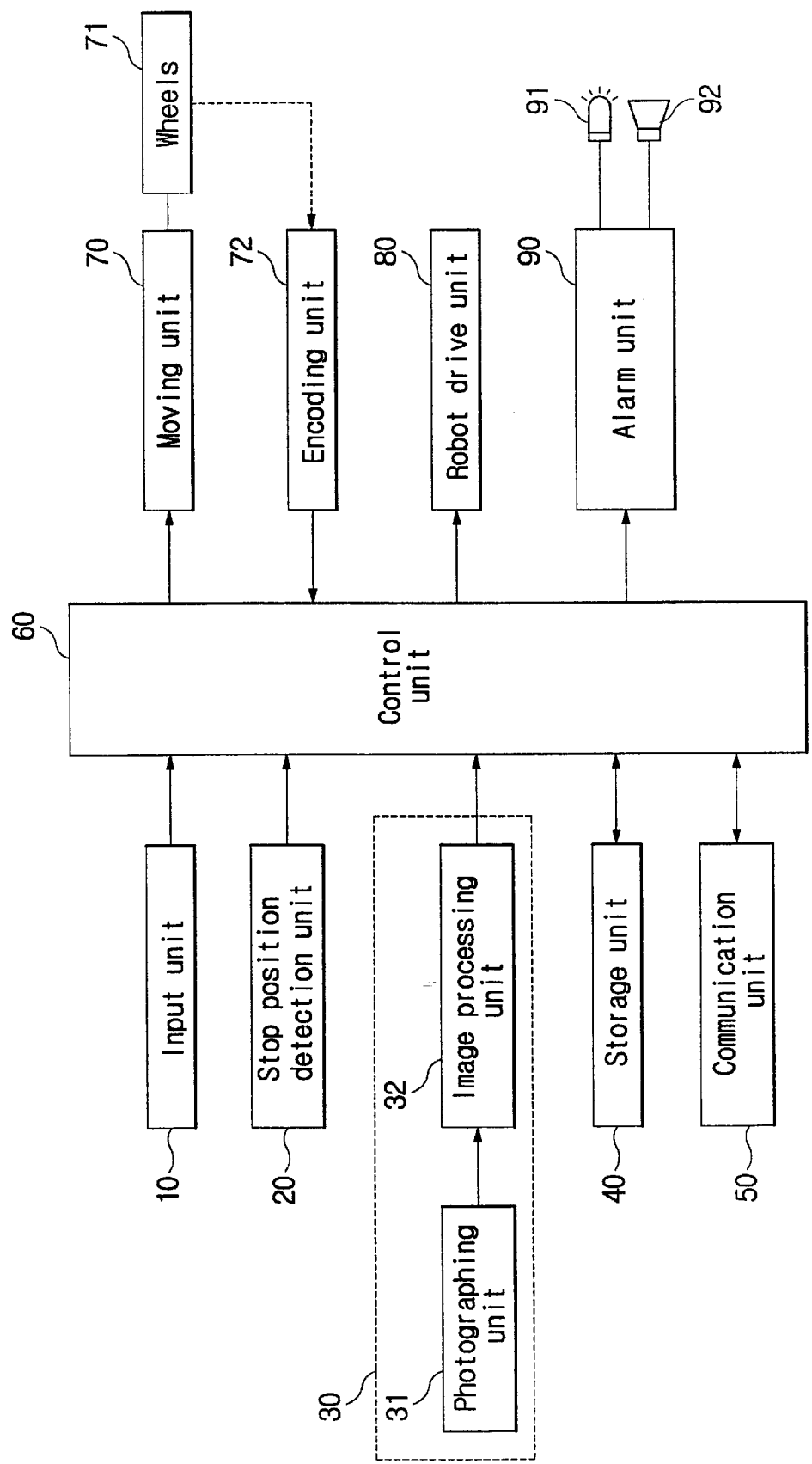
FIG. 1 is a block diagram showing a construction of an automatic guided system according to an embodiment of the present invention.

Reference will now be made in detail to the present preferred embodiments of the present invention, examples of which are illustrated in the accompanying drawings, wherein like reference numerals refer to like elements throughout.

FIG. 1 is a block diagram showing a construction of an automatic guided system according to an embodiment of the present invention.

As shown in FIG. 1, an automatic guided vehicle 100 includes a control unit 60 that controls an entire operation of the automatic guided vehicle 100. An input unit 10 to set the operation of the automatic guided vehicle 100 is electrically connected to the control unit 60. The input unit 10 includes a key input unit to input information manually.

Figure 2:
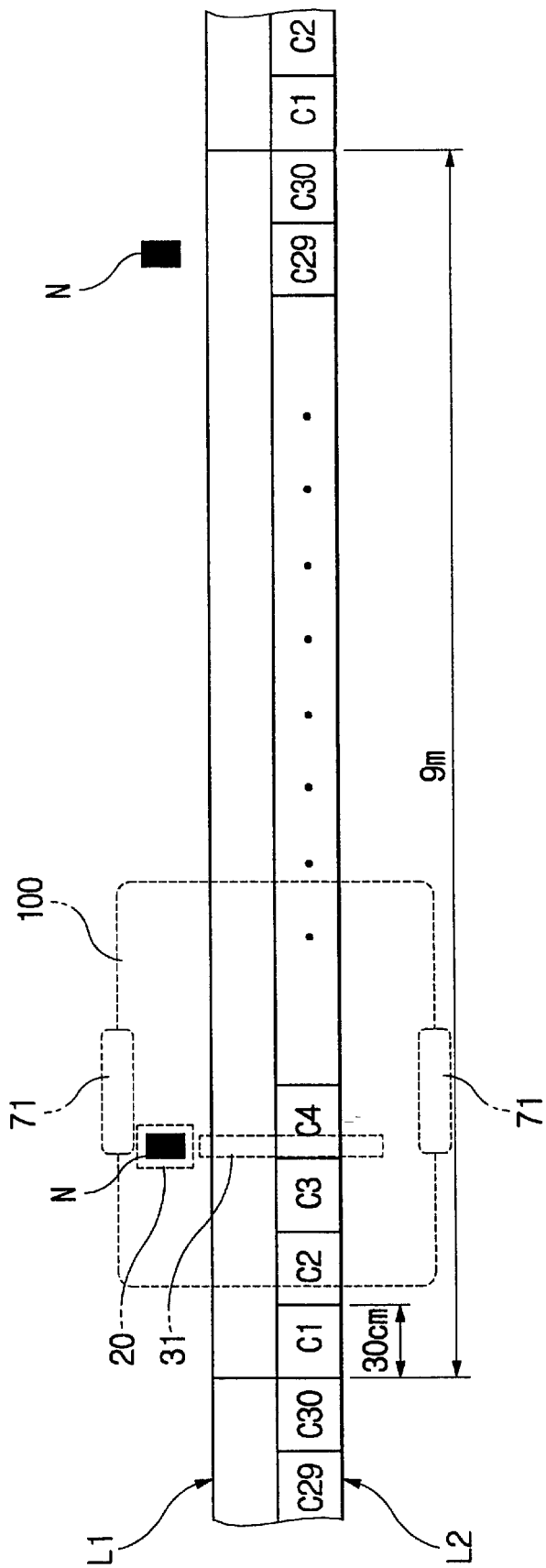
FIG. 2 is a view showing an operation of the automatic guided vehicle of the automatic guided system shown in FIG. 1.

FIG. 2 is a view showing an operation of the automatic guided vehicle. As shown in FIG. 2, the automatic guided vehicle 100 including a stop position detection unit 20, which detects stop position tags N positioned beside guide lines L1 and L2 indicating a path of movement of the automatic guided vehicle 100, is connected to the control unit 60. The automatic guided vehicle 100 also includes a vision unit 30 to detect the guide lines L1 and L2, and a storage unit 40 to store a program to control the automatic guided vehicle, information inputted through the input unit 10, data obtained during the operation of the automatic guided vehicle, and color code information. The storage unit 40 is connected to the control unit 60. The vision unit 30 includes a photographing unit 31 to photograph the guide lines L1 and L2, and an image processing unit 32 to analyze an image photographed by the photographing unit 31 and to output analyzed image data to the control unit 60. The photographing unit 31 may be implemented by a charge-coupled device camera.

The automatic guided vehicle 100 further includes a communication unit 50 to perform data communication with external devices. The communication unit 50 is connected to the control unit 60. The automatic guided vehicle 100 also includes a moving unit 70 to operate wheels 71 of the automatic guided vehicle 100 under the control of the control unit 60, an encoding unit 72 to detect rotation of the wheels 71 and to output detection information to the control unit 60, and a robot drive unit 80 to drive a robot under the control of the control unit 60.

The guide line L1 may be referred to as a first guide line L1 and the guide line L2 may be referred to as a second guide line L2. The first guide line L1 is divided into a plurality of zones at regular intervals of about 9m. The second guide line L2 is divided into a plurality of zones the same as the first guide line L1, and each of the zones of the second guide line L2 is divided into a plurality of differently colored sections C1 to C30 at regular intervals of 30 cm. Stop position tags N to represent stop positions of the automatic guided vehicle 100 are provided beside the first guide line L1. The stop position tags N are formed of magnetic tapes, and the stop position detection unit 20 to detect the stop position tags N is preferably embodied by a magnetic sensor that detects a magnetic field. Each of the stop position tags N has a width of one third of each colored section of the second guide line L2 of about 10 cm.

Hereinafter, an operation of the automatic guided system will be described.

Figure 3:
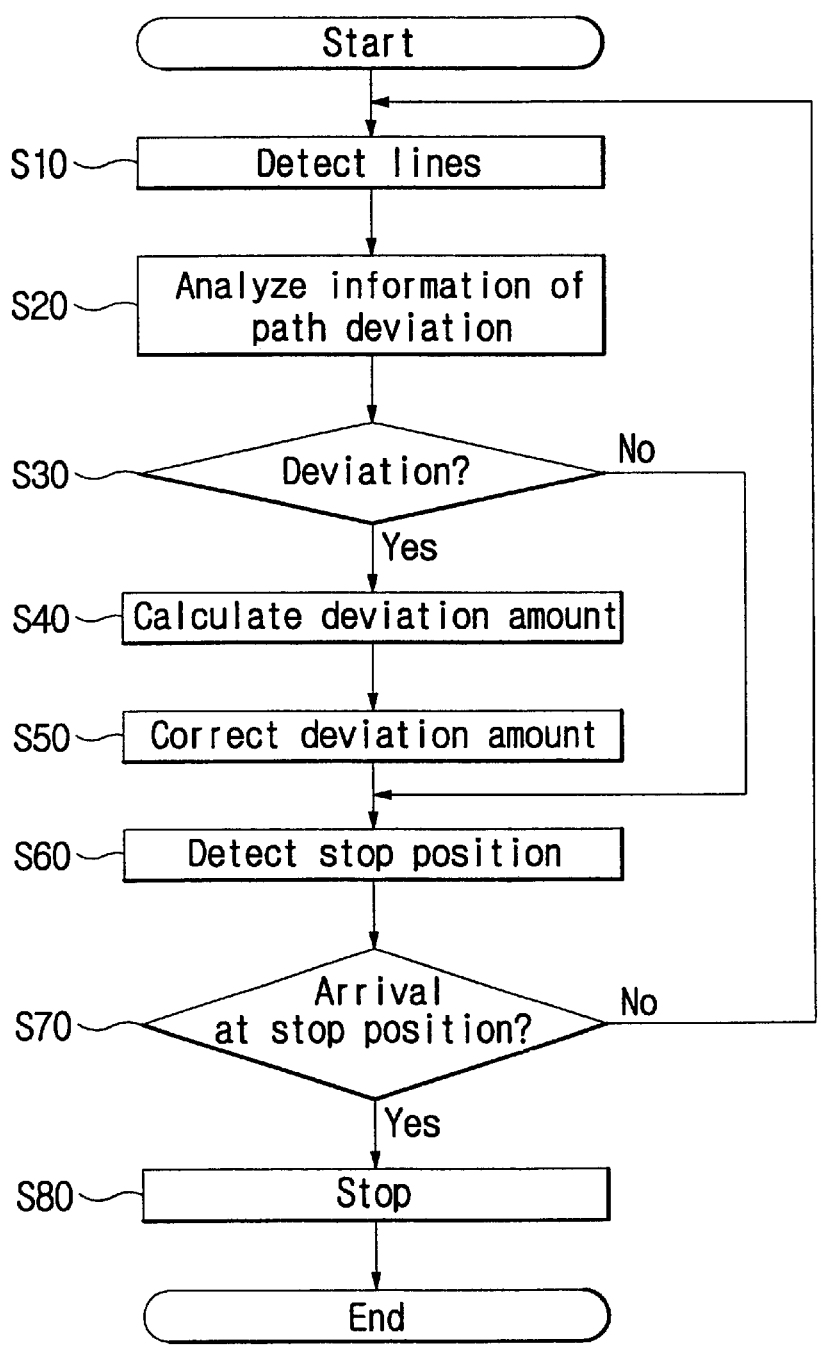
FIG. 3 is a flowchart showing a method to control the automatic guided system in FIG. 1.

FIG. 3 is a flowchart showing a method to control the automatic guided system.

Referring now to FIG. 3, when the automatic guided vehicle 100 moves along the first and second guide lines L1 and L2, the photographing unit 31 photographs the first and second guide lines L1 and L2. The image processing unit 32 captures and processes an image photographed by the photographing unit 31, and transmits image data thereof to the control unit 60. The control unit 60 receives the image data transmitted from the image processing unit 32 and detects the first and second guide lines L1 and L2 at operation S10.

The control unit 60 analyzes information about a path deviation of the automatic guided vehicle 100 at operation S20. The control unit 60 determines whether the automatic guided vehicle 100 has deviated from the path at operation S30.

If at operation S30 the automatic guided vehicle 100 deviates from the path, the control unit 60 calculates an amount of the deviation at operation S40.

To correct the deviation, the control unit 60 controls the moving unit 70 to drive the wheels 71 at operation S50. The control unit 60 detects a stop position tag N through the stop position detection unit 20 at operation S60. The control unit 60 determines whether the automatic guided vehicle 100 arrives at the stop position by detecting the stop position tag N through the stop position detection unit 20 at operation S70.

If at operation S70 the automatic guided vehicle 100 arrives at the stop position, the control unit 60 controls the moving unit 70 to stop the wheels 71 and, accordingly, the automatic guided vehicle 100 at operation S80.

Figure 4A:
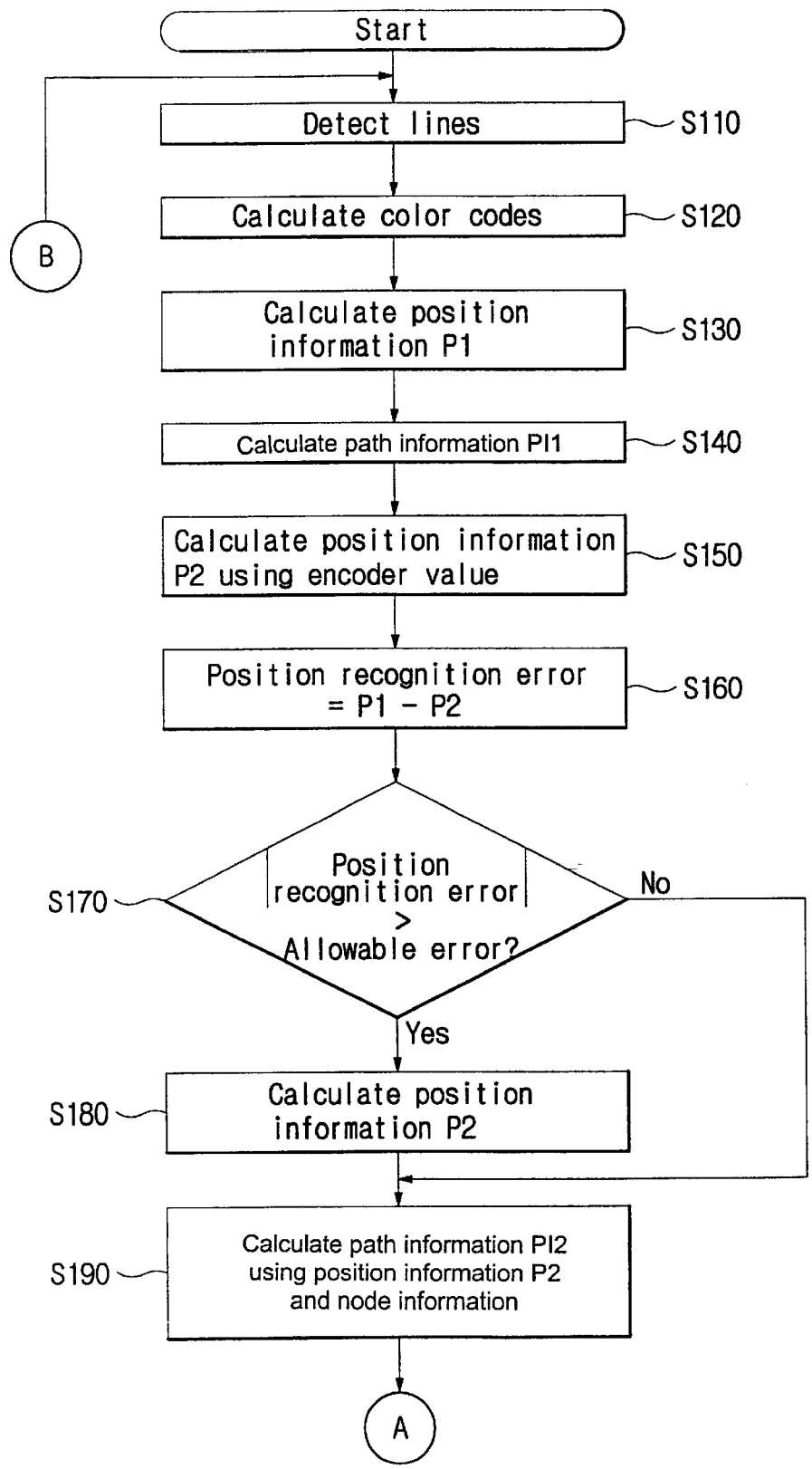
FIGS. 4A and 4B are flowcharts showing the control method of the automatic guided system in FIG. 1.
Figure 4B:
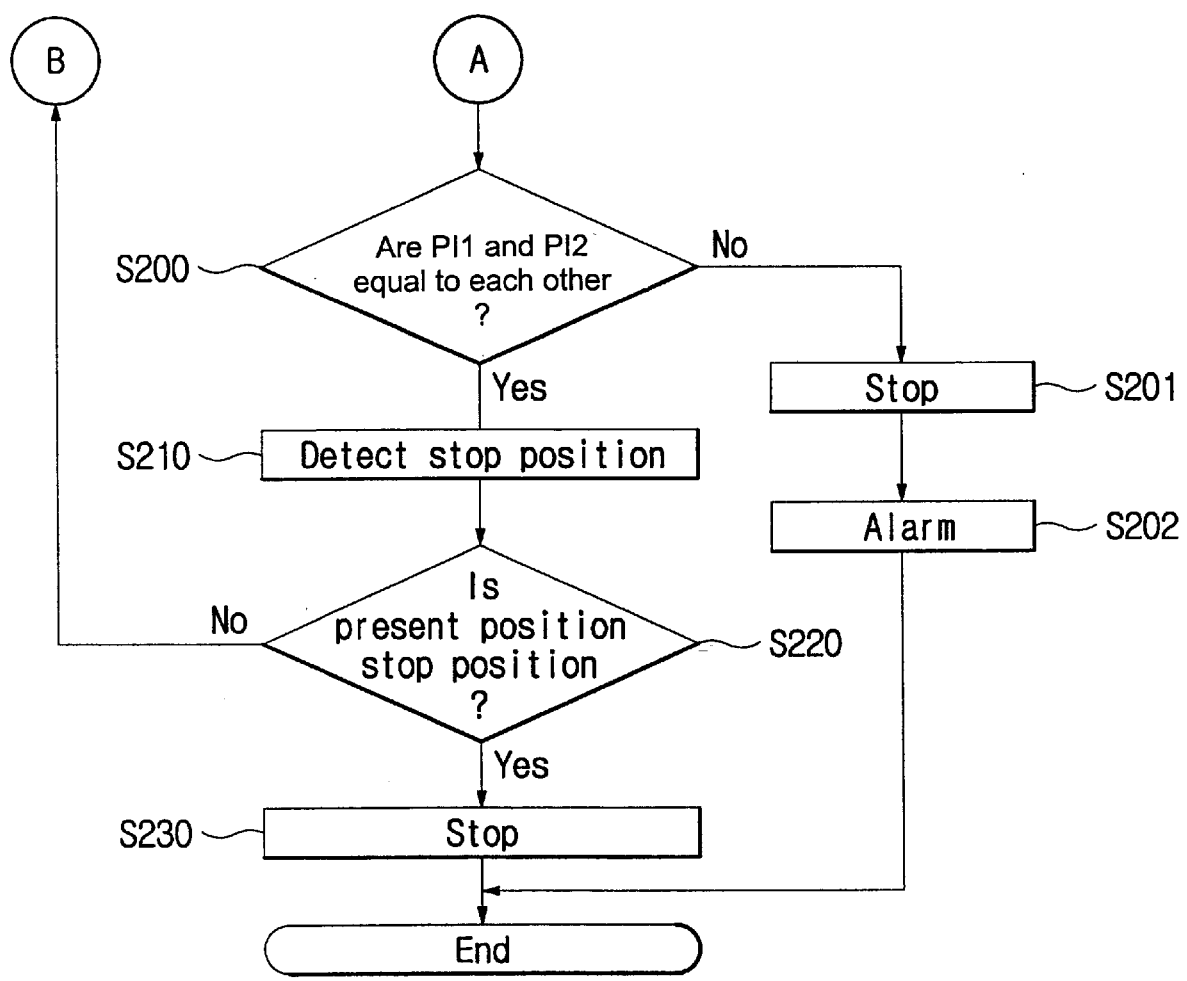

FIGS. 4A and 4B are flowcharts showing the control method of the automatic guided system.

Referring now to FIGS. 4A and 4B, when the automatic guided vehicle 100 moves along the first and second guide lines L1 and L2, the photographing unit 31 photographs the first and second guide lines L1 and L2. The image processing unit 32 captures and processes an image photographed through the photographing unit 31 and transmits image data thereof to the control unit 60. The control unit 60 receives the image data transmitted from the image processing unit 32 and detects the first and second guide lines L1 and L2 at operation S10.

The control unit 60 distinguishes colors of the second guide line L2 in the image data, and calculates predetermined color codes stored in the storage unit 40 to correspond to the distinguished colors at operation S120. Accordingly, the control unit 60 recognizes the colored sections C1 to C30 of the second guide line L2 via the color codes.

The control unit 60 calculates position information P1 of the automatic guided vehicle 100 using the calculated color codes and information of the stop position tag N (e.g., node information) at operation S130, and calculates path information PI1 at operation S140. The control unit 60 calculates position information P2 of the automatic guided vehicle 100 using an encoder value for the rotation of the wheels 71 obtained through the encoding unit 72 at operation S150.

The control unit 60 calculates an error of position recognition that corresponds to a difference between the position information P1 calculated at operation S140 and the position information P2 calculated at operation S150, at operation S160. After calculating the position recognition error, the control unit 60 determines whether an absolute value of the position recognition error is larger than a predetermined allowable error at operation S170. If at operation S170 the absolute value of the position recognition error is larger than the allowable error, the control unit 60 corrects the position information P2 calculated through the encoding unit 72 at operation S180.

After correcting the position information P2, the control unit 60 calculates path information PI2 of the automatic guided vehicle 100 using the information of the stop position tag N and the corrected position information P2 at operation S190.

After calculating the path information L2, the control unit 60 determines whether the path information PI1 and the path information PI2 are equal to each other at operation S200. If at operation S200 the path information PI1 and the path information PI2 are equal to each other, the control unit 60 detects the stop position tag N while the vehicle 100 moves through the stop position detection unit 20 at operation S210. Thus, the control unit 60 determines whether a present position of the automatic guided vehicle 100 is a stop position (e.g., whether the stop position tag N is detected) at operation S220.

If at operation S220 the present position of the automatic guided vehicle 100 is not the stop position, the control unit 60 returns to operation S110. However, if at operation S220 the present position of the automatic guided vehicle 100 is the stop position, the control unit 60 controls the moving unit 70 to stop the wheels 71 and, accordingly, the automatic guided vehicle 100 at operation S230.

If at operation S200 the path information PI1 and the path information PI2 are not equal to each other, the control unit 60 controls the moving unit 70 to stop the wheels 71 and, accordingly, the automatic guided vehicle 100 at operation S201. The control unit 60 thereby controls an alarm unit 90 to activate a visual alarm through a lamp 91 and activate an audible alarm through a speaker 92 at operation S202.

As described above, the automatic guided system and control method thereof corrects an error of position recognition so that accurate position control is possible. Therefore, an accident such as a collision is prevented and stability of movement of an automatic guide vehicle is improved.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An automatic guided system, comprising:
    guide lines positioned along a path of movement;
    stop position tags formed beside the guide lines at predetermined positions; and
    an automatic guided vehicle moving along the guide lines and stopping at the predetermined positions of the stop position tags to perform work, the automatic guided vehicle including:
        a vision unit to photograph the guide lines,
        a stop position detection unit to detect the stop position tags,
        a moving unit to drive wheels of the automatic guided vehicle to move the vehicle,
        an encoding unit to detect rotation of the wheels, and
        a control unit to control the moving unit in response to output data from the vision unit, the stop position detection unit, and the encoding unit.

2. The automatic guided system according to claim 1, wherein the guide lines comprise:
    a first guide line divided into a plurality of zones at first regular intervals; and
    a second guide line divided into a plurality of zones the same as the first guide line, each of the zones of the second guide line being divided into a plurality of differently colored sections at second regular intervals.

3. The automatic guided system according to claim 2, further comprising:
    a storage unit to store predetermined color codes that correspond to a respective one of colored sections of the second guide line.

4. A method of controlling an automatic guided system, the automatic guided system having an automatic guided vehicle moving along first and second guide lines and stopping at predetermined positions of stop position tags, the first guide line divided into a plurality of zones at first regular intervals, the second guide line divided into a plurality of zones the same as the first guide line, each of the zones of the second guide line being divided into a plurality of differently colored sections at second regular intervals, the method comprising:
    calculating first position information of the automatic guided vehicle using a predetermined color code corresponding to a respective one of the colored sections of the second guide line and information of one of the stop position tags;
    calculating second position information using an encoder value indicative of the driving of the wheels of the automatic guided vehicle;
    calculating an error of position recognition using the first and second position information; and
    correcting the second position information based upon the error of position recognition.

5. The method to control the automatic guided system according to claim 4, wherein the calculating of the error of position recognition comprises:
    calculating the error of position recognition using a difference between the first position information and the second position information; and
    determining whether an absolute value of the error of position recognition is more than a predetermined allowable error.

6. The method to control the automatic guided system according to claim 5, wherein the correcting the second position information comprises:
    correcting the second position information to correspond to the first position information if the absolute value of the error is more than the allowable error.

7. The method to control the automatic guided system according to claim 4, further comprising:
    calculating first path information of the automatic guided vehicle using the first position information and the information of the one stop position tag;
    calculating second path information of the automatic guided vehicle using the corrected second position information and the information of the one stop position tag; and
    stopping the automatic guided vehicle at a stop position of the one stop position tag if the first path information and the second path information are equal to each other.

8. The method to control the automatic guided system according to claim 7, further comprising:
    activating an alarm and stopping the automatic guided vehicle at a present position of the automatic guided vehicle if the first path information and the second path information are not equal to each other.

9. An automatic guided system having an automatic guided vehicle moving along guide lines and stopping at predetermined positions of stop positions tags, the automatic guided vehicle comprising:
    a robot unit to perform work of the automatic guided vehicle;
    a vision unit to photograph the guide lines;
    a stop position detection unit to detect the stop position tags;
    a moving unit to drive wheels of the automatic guided vehicle to move the vehicle;
    an encoding unit to detect rotation of the wheels; and
    a control unit to control the moving unit in response to output data from the vision unit, the stop position detection unit, and the encoding unit.

10. The automatic guided system according to claim 9, wherein the vision unit comprises:
    a photographing unit to photograph the guide lines; and
    an image processing unit to analyze an image photographed by the photographing unit and to output analyzed image data to the control unit.

11. The automatic guided system according to claim 9, wherein the stop position tags are formed of magnetic tapes, and the stop position detection unit includes a magnetic sensor to detect a magnetic field to detect the stop position tags.

12. The automatic guided system according to claim 9, wherein the control unit determines whether the automatic guided vehicle deviates from a path of operation, calculates an amount of deviation if the automatic guided vehicle has deviated from the path of operation, and corrects the deviation when the automatic guided vehicle arrives at a stop position.

13. The automatic guided system according to claim 9, wherein the guide lines include a first guide line divided into a plurality of zones at first regular intervals, and a second guide line divided into a plurality of zones the same as the first guide line, each of the zones of the second guide line being divided into a plurality of differently colored sections at second regular intervals.

14. The automatic guided system according to claim 13, wherein the control unit:

calculates first position of the automatic guided vehicle information using a predetermined color code corresponding to a respective one of the colored sections of the second guide line and information of one of the stop position tags, calculates second position information automatic guided vehicle using an encoder value indicative of the driving of the wheels of the automatic guided vehicle, and calculates an error of position recognition using the first and second position information, and corrects the second position information based on the error of position recognition.

15. The automatic guided system according to claim 14, wherein the control unit:

calculates the error of position recognition using a difference between the first position information and the second position information, and determines whether an absolute value of the error of position recognition is more than a predetermined allowable error.

16. The automatic guided system according to claim 15, wherein the control unit corrects the second position information to correspond to the first position information if the absolute value of the error is more than the allowable error.

17. The automatic guided system according to claim 14, wherein the control unit:

calculates first path information of the automatic guided vehicle using the first position information and the information of the one stop position tag, calculates second path information of the automatic guided vehicle using the corrected second position information and the information of the one stop position tag, and stops the automatic guided vehicle at a stop position of the one stop position tag if the first path information and the second path information are equal to each other.

* * * * *